United States Patent Office 3,180,551
Patented Apr. 27, 1965

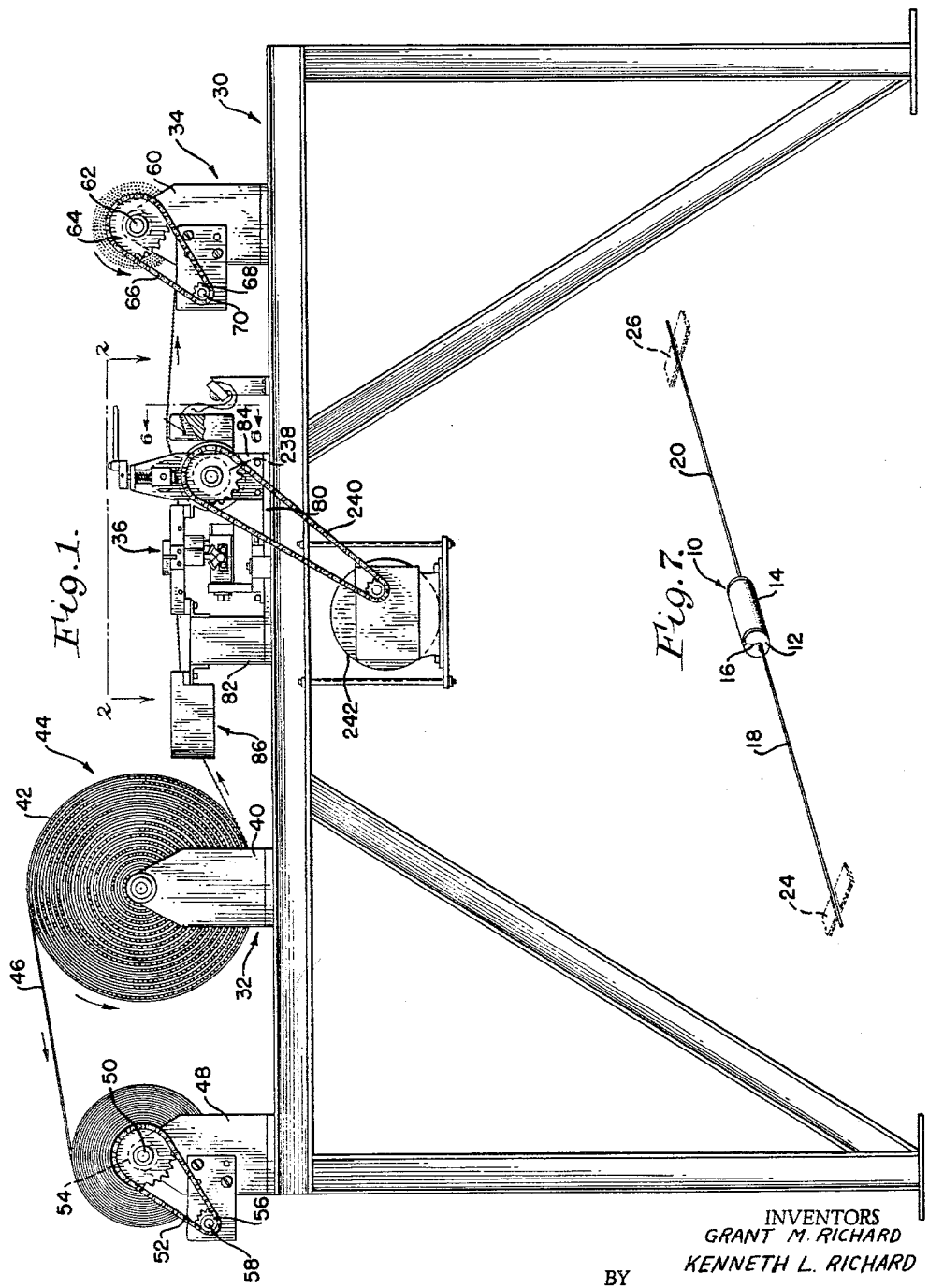

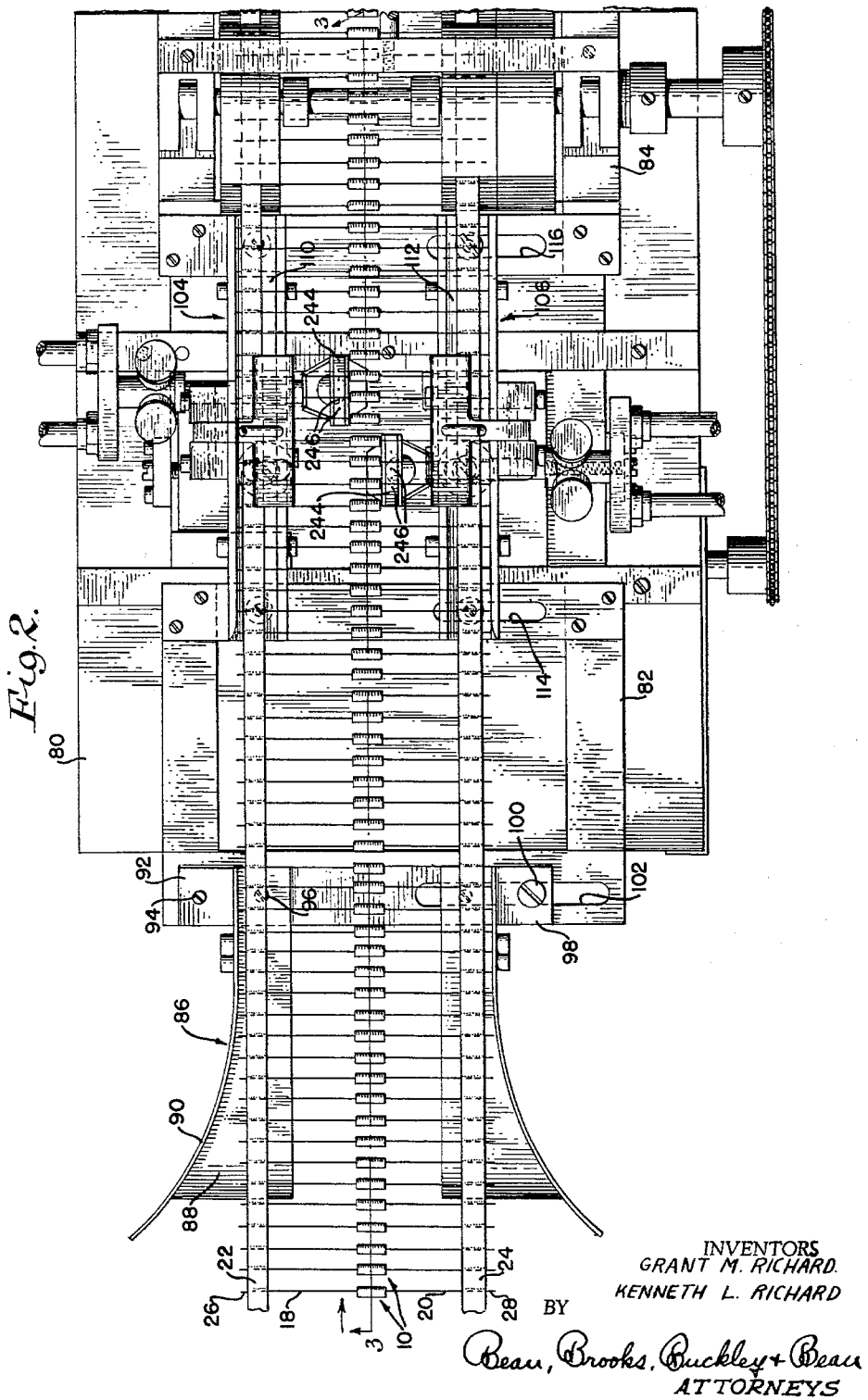

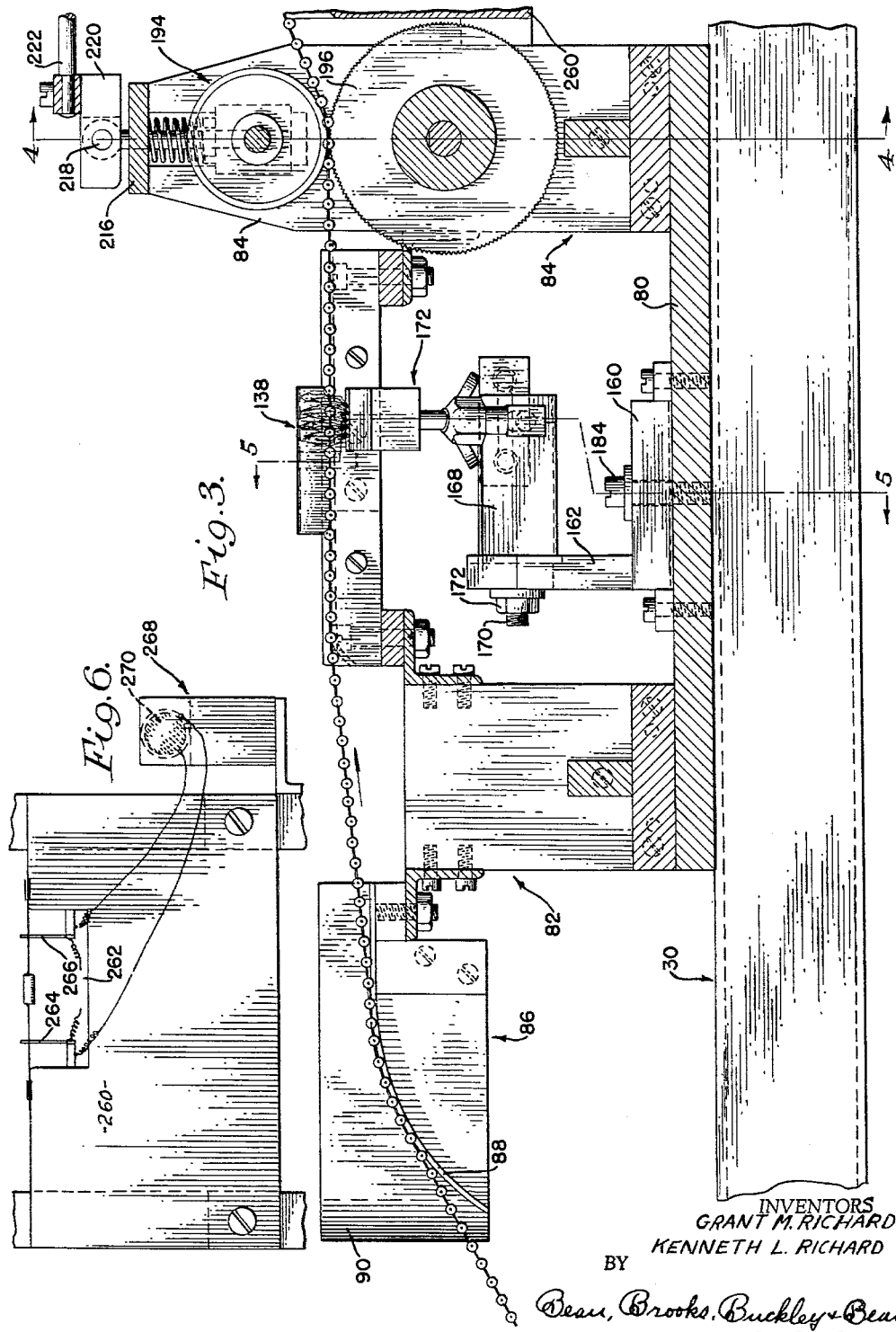

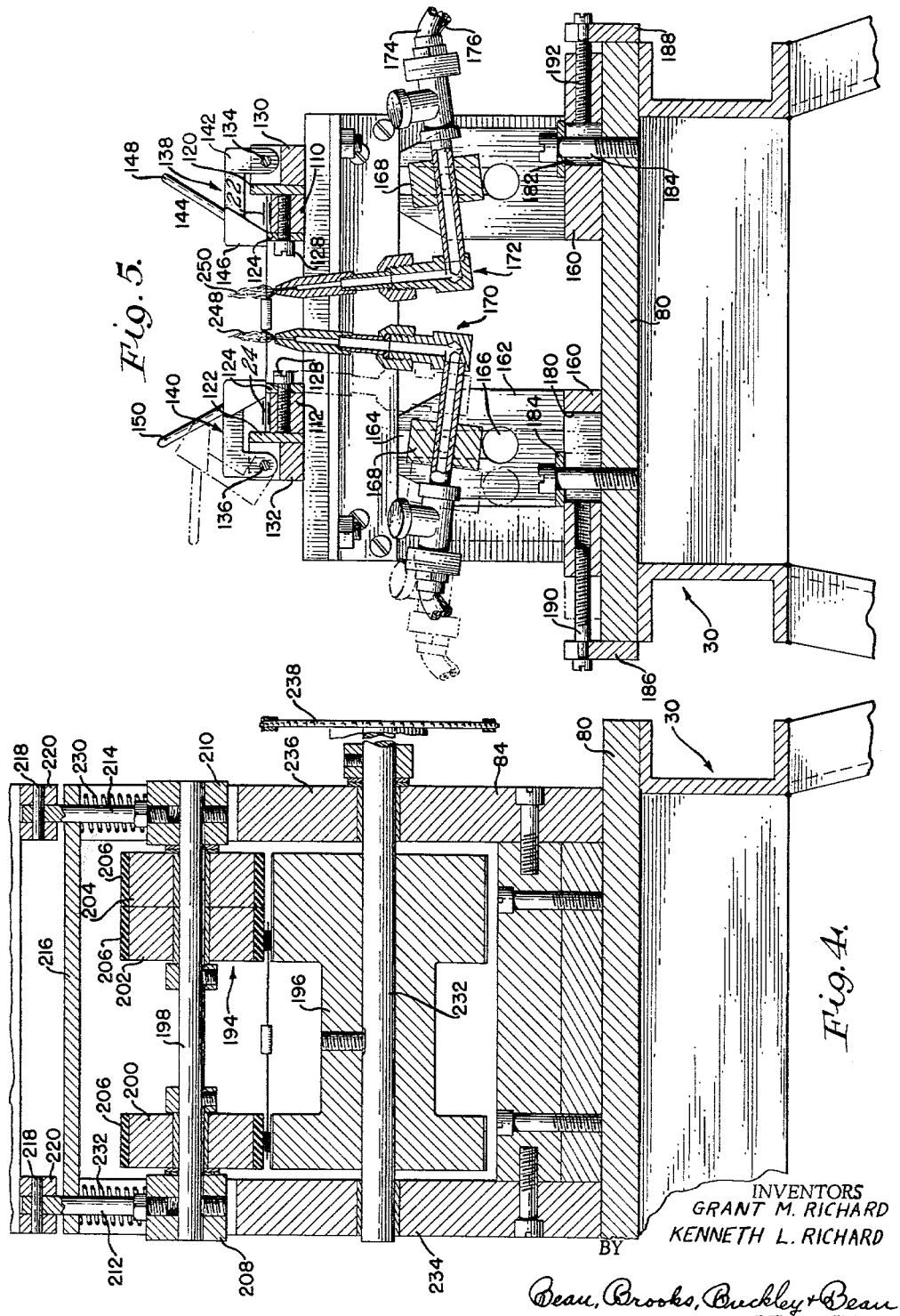

3,180,551
MACHINE FOR SOLDERING COILS
Kenneth L. Richard, S. Ostrander Road, and Grant M. Richard, Mill Road, both of East Aurora, N.Y.
Filed Mar. 27, 1963, Ser. No. 268,296
6 Claims. (Cl. 228—47)

This invention relates to a soldering machine and pertains, more particularly, to a soldering machine adapted to join the ends of a wire coil wound upon an insulating body to the terminal bars associated with the opposite ends of such insulating body. In the manufacture of RF coils and like electrical components of miniaturized form, considerable time is consumed in such manufacture to effect the soldering of the ends of the coil wire to the terminal bars which form, in the finished product, means by which external connections are made to the component when the same is assembled as a circuit element. Normally, such soldering of the coil wire ends is effected manually, in ganged fashion, but even this type of process is time consuming and requires some degree of skill on the worker's part. It is, therefore, of primary concern in connection with the present invention to provide an improved machine which is particularly well adapted and suited for soldering the coil wire ends of an RF coil or the like to the terminal bar of the assembly in which the soldering process is efficient, effective and rapid.

A further object of this invention is to provide an improved machine of tthe character above described which is adapted to handle a roll of RF coils and the like which are flexibly joined together and disposed in spaced parallelism so that the terminal bars of each coil are presented transversely of the roll strip so as to be effectively fed through a soldering machine according to the present invention whereby sequential and continuous soldering action may be effected in a rapid and efficient manner.

Another object of this invention is to provide an improved soldering machine of the character above set forth which employs a roll supply support and a take-up mechanism disposed in spaced relationship thereto, the supply roll being unwound and rewound respectively on the two such mechanisms and with there being an intervening soldering means to effect the sequential and continuous soldering of individual coils as they are presented thereto, there further being mechanism associated with the soldering means for advancing the roll strip by a variable speed motor so the most effective speed may be achieved for soldering action.

A further object of this invention is to provide an improved soldering machine for handling and operating upon a strip of flexibly interconnected and transversely extending RF coils and the like wherein such strip is caused to be fed across or over a guide rail assembly which is so constructed and arranged as to positively locate the individual articles for presentation to a pair of spaced apart sheet-like flame areas and wherein the construction of the guide rail assembly is such as to accommodate the strip while permitting such strip to be made of simple fashioned form.

Other objects and advantages of the invention will appear from the description hereinbelow and the accompanying drawing wherein:

FIG. 1 is an elevational view illustrating a machine constructed in accordance with the present invention;

FIG. 2 is an enlarged plan view taken of that section of the machine indicated by section line 2—2 in FIG. 1 and illustrating details of the soldering station;

FIG. 3 is a longitudinal section taken through the assembly shown in FIG. 2;

FIG. 4 is a transverse vertical section taken along the plane of section line 4—4 in FIG. 3 illustrating details of the nip roll means;

FIG. 5 is a vertical section taken substantially along the plane of section line 5—5 in FIG. 3 showing details of the burner means;

FIG. 6 is an enlarged vertical section as taken along section line 6—6 in FIG. 1 illustrating the testing station; and FIG. 7 is a perspective view showing one of the RF coils or the like.

With reference to FIG. 7 wherein an article with which the present invention is concerned is shown, the electrical component illustrated therein is an RF coil indicated generally by the reference character 10 and including an insulating body 12 of generally cylindrical form and having a number of turns of a wire conductor 14 wound thereon, substantially between the opposite ends of the cylindrical body 12. The body 12 is also provided with a longitudinally extending slot or notch which provides an anchoring point for the opposite ends of the coil wire, one such end being indicated by the reference character 16 and as will be seen, such end is wound about the terminal bar 18 to anchor the coil wire end thereto. The opposite end of the coil wire is similarly wrapped about the terminal bar 20. Articles constructed in the fashion shown in FIG. 7 may be subsequently provided with a coating of solder on the terminal bars 18 and 20 to include the wrappings of the coil wire ends 16 therearound to provide a good electrical connection between the opposite ends of the coil wire and the terminal bars 18 and 20, as will be well understood in the art. According to the present invention, the terminal bars 18 and 20 are "tinned" with solder before the coil wire ends are wrapped therearound and, after wrapping, the terminal bars 18 and 20 are heated so that the tinning electrically joins the coil wire ends to the respective terminal bars. After the coil wire ends are wrapped about the tinned terminal bars 18 and 20, the coils are joined flexibly into a belt or strip like form in the fashion which will be seen in FIG. 2. In this figure, it will be seen that a plurality of coils 10 have been joined by means of flexible tapes such as those indicated by reference characters 22 and 24, the coils extending transversely of the strip and with the tapes being so positioned as to expose opposite end portions 26 and 28 of the respective terminal bars 18 and 20, substantially as is shown. Preferably, as can be best seen in FIGS. 4 and 7, the strips 24 and 26 are of double thickness and may comprise, simply, two strips of masking tape or the like having their pressure-sensitive sides facing each other.

With reference now particularly to FIG. 1, it will be seen that the machine includes a stand, base or frame indicated generally by the reference character 30 which has mounted thereon a work supporting station indicated generally by the reference character 32, a work take-up station indicated generally by the reference character 34 and a soldering station indicated generally by the reference character 36. The aforementioned strips or belts or flexibly interconnected coils is provided in roll form for support at the station 32 from whence the strip is unwound to pass over and through the soldering station 36 for ultimate disposition to and for rewinding at the take-up station 34.

The station 32 may consist simply of a stand or suitable bracket assembly 40 trunnioning a shaft or spindle 42 upon which the roll 44 is mounted, substantially as is shown. When the articles are produced and formed into the flexible belt as aforesaid, it is preferred that when wound into the roll form 44, a protective strip 46 be wound therewith and coextensive in length with the length of the strip so formed onto the roll 44. With such an arrangement, ready means is provided for unwinding the roll 44 for delivery to the take-up assembly 34. Thus, the base 30 mounts a further bracket 48 having a driven spool or shaft 50 which will wind the tape or strip 46 and, in so doing, unwind the roll 44. Any suitable external power source may be provided for imparting rotative motion to the shaft 50, the same being driven through the means of a chain 52 engaged with the sprocket 54 rigid with shaft 50 and engaged with a pinion sprocket 56 mounted on a shaft 58 either directly or indirectly driven from a suitable electric motor (not shown) or like power source for imparting the requisite rotary motion to the shaft 50.

The take-up station 34 is essentially a rewind mechanism mounted on a suitable bracket or support 60 which rotatably mounts a shaft 62 mounting thereon a sprocket 64 which is connected through the chain 66 to a drive sprocket 68 mounted on the drive shaft 70 which is, in turn, powered by any suitable source such as an electric motor (not shown) for imparting the requisite rotary motion to the shaft 62.

The soldering means 36 may include a base plate portion 80 having pedestal frame portions 82 and 84 mounted thereon in upstanding relation thereto, the former of which mounts, adjacent the supporting means 32, an entrance mouth assembly indicated generally by the reference character 86. The entrance mouth portion will be seen to consist of two substantially identical assemblies, each of which has an upwardly inclining ramp portion 88 and an outer curvilinear side wall 90. One of these assemblies is rigidly affixed to the pedestal frame 82 in cantilever relation thereto while the other of such assemblies is adjustably mounted for movement toward and away from the first assembly. For this purpose, it will be seen that the former of such assemblies is provided with a rigid ear or flange portion 92 which is attached by means of a suitable fastener 94 directly to the pedestal frame 82, a further fastener 96 being provided on the inner side of the ramp portion 88 to complete the direct connection. The other assembly is provided with a similar ear or bracket flange portion 98 which carries a clamping fastener 100 which is cooperable with an elongate slot 102 provided in the pedestal assembly 82 so that this portion of the entrance mouth is movable toward and away from the other, as aforesaid. The purpose of this relationship will be presently apparent.

Beyond the entrance mouth portion 86, there is provided a guide rail assembly which includes the two spaced parallel guide rails indicated generally by reference characters 104 and 106 in FIG. 2. In the specific embodiment shown, the guide rail 104 includes a bar 110 which bridges between the two pedestal portions 82 and 84 and is rigidly fixed thereto while the other assembly 106 includes a similar bar 112 which bridges between the pedestals 82 and 84 but which is adjustably secured thereto by means of suitable fasteners cooperable with the slots 114 and 116 for movement toward and away from the other guide rail 104, in a manner very similar to the adjustment of the entrance mouth as has been set forth hereinabove.

As can be seen more clearly in FIG. 5, along the outer edges of the two bars 110 and 112 are the abutment walls or flanges 120 and 122 respectively and which extend upwardly above the respective bars 110 and 112, substantially as is shown in this figure. Additionally, the inner edge of each bar 110 and 112 is provided with an upstanding rail 124, 124 respectively, these rails being secured to their respective bars by the fasteners 128 as shown. Further, each of the abutment members 120 and 122 is provided with an outstanding bracket lug such as those indicated by reference characters 130 and 132 which carry pivot pins 134 and 136 for rotatably mounting the hold-down assemblies indicated generally by reference characters 138 and 140. Each such hold-down member includes an L-shaped arm member 142 pivoted at one end to its respective lug as shown and carried, at its opposite or free end, an enlarged anvil portion 144 having a narrow nose portion 146 which is adapted to oppose the upper or supporting edge of the respective rails 124. Additionally, handle members 148 and 150 may be provided on these hold-down members, substantially as is shown.

As can best be seen in FIG. 5, the burner assembly comprises two similar mechanisms, each of which includes a plate 160 provided with an upstanding bracket leg 162. Each such bracket is provided with a downwardly extending slot 164 initiating at the upper edge thereof and terminating at its lower end in an enlarged portion 166. In each case, a block 168 is provided which carries a threaded element 170 which projects through the standard or ear 162 and receives thereon a nut 172 for selectively locking the block 168 in place. Each block 168 carries one of the burner assemblies indicated generally by reference characters 170 and 172 which may be connected, through suitable flexible lines 174 and 176 to an external supply of fuel and oxygen, it being understood that the specific fuel involved is not of import, per se, to this invention. Each plate 160 is provided with an elongate slot 180 or 182 through which the fastening members 184 extend, as is shown most clearly in FIG. 5 and also in FIG. 3. Respective bracket ears 186 and 188 carried by the base plate 80 hold adjustment screws 190 and 192 rotatably captive therewithin and are threadedly engaged with the respective plates 160 to effect adjustment transversely of the plate 181 of the corresponding burner assemblies 170 and 172. For this purpose, it will be appreciated that the fasteners 184 are slacked off to permit such adjustment and it will also be appreciated that the burner assembly 170 which is on that side wherein the guide rail and entrance mouth portions are adjustable is provided with a longer slot 180 than is the other slot 182 in the other plate 160. The purpose of this construction will be presently apparent.

The drive mechanism or feed assembly portion of the soldering means is illustrated in FIGS. 3 and 4 and will be seen to include the nipples 194 and 196 which are adapted to sandwich the strips 24 and 26 therebetween. As is shown in FIG. 4, the upper nipple assembly includes a shaft 198 upon which the rolls proper are mounted, the rolls in this instance being separated as shown and comprising individual discs 200, 202 and 204 having a rubber or like resilient coating 206 thereon. The shaft 198 is carried between the journal blocks 208 and 210 and these journal blocks 208 and 210 are connected to the threaded ends of the post members 212 and 214. The post members extend upwardly through horizontal flange portions 216 of the pedestal assembly 84 and are pivotally connected at their upper ends by means of pivot shafts 218 to the cam blocks 220. Each cam block is provided with a handle portion 222 by means of which it may be moved between the full line position shown in FIG. 3 to an upright position not shown wherein the cam block 220 engages the upper surface of the flanges 216 in each case to lift the upper nipple assembly. In the former instance, the upper nipple assembly is urged toward the lower nipple assembly 196 under the action of the compression springs 230 and 232 and, in the latter instance, the cam blocks 220 compress the springs and lift the upper nipple assembly away from the lower nipple assembly, as will be readily appreciated.

The lower nipple assembly 196 includes a shaft 233 journalled between opposite side frame portions 234 and 236 of the pedestal 84 and carrying, at its outboard end, a sprocket 238 whereby the lower nipple is driven, through the medium of a chain 240 from a suitable power source such as the variable speed electric motor 242 shown in FIG. 1.

It will be appreciated that the coil assemblies as is shown in FIG. 7 may vary as to length of their body portions 12 and since it is more economically feasible to provide standard lengths of terminal bars 18 and 20 regardless of the lengths of the body 12, the over-all length of the various types of coil assemblies will be different. It is for this reason that the aforesaid adjustments of the entrance mouth assembly 86, the guide rail assembly including the rail members 104 and 106 and the adjustment which is permitted of the upper nipple assembly is provided. Further, the burners must be capable of adjustment as aforesaid to compensate for the variation in over-all lengths between different types of coil assemblies. In one roll 44, there will of course only be one length of coil assembly. Since the upper portion of the entrance mouth assembly 96 in FIG. 2 is fixed while the lower side as shown in that figure is movable and since the same relationship prevails as between the two rail assemblies 104 and 106, it will be appreciated that the upper or corresponding to the upper side in FIG. 2 of the assembly is used as an indexing surface which, as a reference, will remain fixed whereas the other side will move to accommodate for the various lengths encountered. Since, on the other hand, it is desirable that the burner assemblies 170 and 172 be capable of very accurate adjustment in any case, both of these assemblies are mounted, as has been set forth hereinabove, for lateral adjustment individually, albeit that the burner assembly 170 is capable of a greater range of movement than is the burner assembly 172. Further, these burner assemblies, as will be readily appreciated, are capable of vertical adjustment as well. In regard to the burner assemblies themselves, it will be seen from a study of FIG. 2 that each includes a burner head 244 which is provided with a series of longitudinally spaced and relatively minute openings 246. It will be appreciated that these openings are spaced apart to allow sheet-like flames such as those indicated by reference characters 248 and 250 to issue from the respective burner assemblies and in straddling relationship to the body 12 of each of the coil assemblies but closely adjacent thereto so as to melt the tinning solder and cause it to coat the coil wire ends and provide good electrical connection to the terminal bars. Since it is desirable that just sufficient heat is provided to the assemblies to effect the soldering action without causing damage thereto, that the drive speed of the strip or belt of flexibly interconnected coils be carefully controlled to achieve the proper effect. To this end, it will be appreciated that the nipple assembly in all cases absolutely controls the linear speed of the belt or strip. Thus, the winding and unwinding mechanisms for the roll 44 do not constitute a controlling factor in the feed of the strip or belt. For this reason, it will be apparent that a slip clutch may be desired to be incorporated in the drive to the assembly 34. Furthermore, the hold-down members 138 and 140, being disposed in the region of the burners 170 and 172, absolutely assure proper vertical positioning of the individual coil components. Furthermore, it will be appreciated that the narrow nose portions 146 thereof engage the terminal bars 18 and 20 inwardly from the tapes 24 and 26 so as to provide a minimum of friction from this source. At the same time, as has been stated hereinabove, the rails 124 and 126 project slightly above the bars 110 and 112 to provide clearance for the strips 24 and 26. As can be seen in FIG. 4, the nipple members are relieved in their central regions to provide adequate clearance for the bodies of the coil assemblies regardless of the lengths thereof. When the belt or strip is issued from the nip rollers, it passes over a guide wall member 260, see particularly FIG. 6, which is notched as at 262 to provide clearance for the body portions of the coils and mounted within this notch are a pair of flexible feelers 264 and 266 disposed so as to be engaged by the respective terminal bars 18 and 20 of each component as it passes such feelers. These feelers are electrically connected to an indicating system 268 including an indicator light 270 so that electrical continuity of each component is tested as it is issued from between the nip rollers 194 and 196. Thus, an operator may detect the presence of any discontinuity and mark, remove or otherwise identify any defected component.

We claim:
1. A machine for soldering conductive ends on the terminal bars of a belt of workpieces in which each workpiece includes a main body portion and a terminal bar extending from each end thereof so that the ends on the terminal bars and the ends of the workpieces are longitudinally aligned, which comprises,
a guide rail assembly including spaced apart support rails and guide members thereadjacent for engaging the ends of terminal bars of a belt of workpieces constructed as aforesaid to position the main body portion of the workpieces in predetermined orientation within the space between said support rails,
nip roll means for translating a belt of workpieces across said guide rail assembly,
and a pair of burners mounted beneath said guide rail assembly in laterally spaced relation to each other for heating the terminal bars of each workpiece in portions thereof adjacent the opposite ends of the main body portions.
2. Apparatus for soldering the ends of formed conductor lengths to connector leads therefor, comprising in combination,
a mounting base,
means for supporting a roll of incompleted workpieces on said base,
take-up roll means on said base spaced from the supporting means,
a guide rail assembly on said base between said take-up means and said supporting means,
said guide rail assembly including laterally spaced rail portions defining a gap therebetween and upright guide portions extending along such rail portions so that workpieces may be particularly oriented relative to said gap,
burner means mounted on said base below said guide rail portions,
said burner means including a pair of burner heads disposed in laterally spaced relation for heating workpieces adjacent the opposite ends of main body portions thereof,
and means between said guide rail assembly and said take-up means for translating workpieces over said guide rail assembly.
3. In a machine of the character described,
a base,
a first driven take-up assembly adjacent one end of said base,
a second driven take-up assembly adjacent the other end of said base,
a work roll mount adjacent said first take-up assembly,
a guide rail assembly disposed between said work roll mount and said second take-up assembly,
said guide rail assembly including spaced guide rails and lateral guide members therealong,
a pair of burners mounted beneath said guide rail assembly,
and nip roll means adjacent said guide rail assembly and between the same and said second take-up assembly for translating a workpiece strip across said guide rail assembly.
4. In a machine for soldering coil wire ends to the terminal bars thereof,
a guide rail assembly including a pair of laterally spaced, generally parallel, upstanding lateral positioning plates adapted to abut the ends of the terminal bars of an RF coil and the like, a pair of support rails disposed in spaced, generally parallel relation to each other and being spaced inwardly from respective lateral positioning plates to leave gaps therebetween, and a hold-down member associated with each guide rail and adapted to engage intermediate portions of terminal bars in pressure-bearing relation thereagainst,
burner means for presenting a pair of spaced, gener- ally parallel sheet-like flame areas between said hold-down members, and means for feeding a belt of flexibly joined, parallel RF coils and the like along said guide rail assembly.

5. A machine for soldering coil wire ends to terminal bars, comprising first means for supporting a roll of flexibly joined, parallel RF coils, including mechanism for unwinding such roll, second means for rewinding the roll, soldering means disposed between the first and second means including a guide rail assembly for supporting the roll strip, burner means for providing a pair of spaced, parallel flame sheets to straddle the bodies of individual RF coils, nip roll means engaging the roll strip to feed same past said burner means, and drive means for said nip roll means to control movement of the roll strip past said burner means independently of said first and second means.

6. A machine for soldering coil wire ends to terminal bars, comprising first means for supporting a roll of flexibly joined, parallel RF coils, including mechanism for unwinding such roll, second means for rewinding the roll, soldering means disposed between the first and second means including a guide rail assembly for supporting the roll strip, burner means for providing a pair of spaced, parallel flame sheets to straddle the bodies of individual RF coils, nip roll means engaging the roll strip to feed same past said burner means, and drive means for said nip roll means to control movement of the roll strip past said burner means independently of said first and second means, and hold-down means for engaging the roll strip against said guide rail assembly in the region of said burner means.

References Cited by the Examiner
UNITED STATES PATENTS

| | | | |
|---|---|---|---|
| 530,094 | 12/94 | Davis | 80—41 |
| 1,226,198 | 5/17 | Erbsloh | 80—41 |
| 2,101,929 | 12/37 | Boerger | 113—129 |
| 2,203,151 | 6/40 | Iversen | 113—123 |
| 2,854,054 | 9/58 | Gross | 29—203 |
| 2,940,161 | 6/60 | Elarde | 29—155.71 |
| 3,092,253 | 6/63 | Senger | 29—155.5 |

FOREIGN PATENTS 393,127  4/24  Germany.

CHARLES W. LANHAM, *Primary Examiner.*
MARCUS U. LYONS, MICHAEL V. BRINDISI,
*Examiners.*